US010640730B2

(12) United States Patent
Abe et al.

(10) Patent No.: US 10,640,730 B2
(45) Date of Patent: May 5, 2020

(54) OIL COMPOSITION AND OXIDATION INHIBITING METHOD OF OIL

(71) Applicant: Kewpie Corporation, Tokyo (JP)

(72) Inventors: Yukina Abe, Tokyo (JP); Hideaki Kobayashi, Tokyo (JP); Shoichi Yoda, Tokyo (JP)

(73) Assignee: Kewpie Corporation, Tokyo (JP)

( * ) Notice: Subject to any disclaimer, the term of this patent is extended or adjusted under 35 U.S.C. 154(b) by 0 days.

(21) Appl. No.: 15/779,283

(22) PCT Filed: Nov. 30, 2016

(86) PCT No.: PCT/JP2016/085496
§ 371 (c)(1),
(2) Date: May 25, 2018

(87) PCT Pub. No.: WO2017/094753
PCT Pub. Date: Jun. 8, 2017

(65) Prior Publication Data
US 2018/0320104 A1  Nov. 8, 2018

(30) Foreign Application Priority Data

Nov. 30, 2015 (JP) ................. 2015-233415

(51) Int. Cl.
| | | |
|---|---|---|
| *C11B 5/00* | (2006.01) | |
| *A23D 9/06* | (2006.01) | |
| *A23D 9/013* | (2006.01) | |
| *A23D 9/007* | (2006.01) | |

(52) U.S. Cl.
CPC ............ *C11B 5/0071* (2013.01); *A23D 9/007* (2013.01); *A23D 9/013* (2013.01); *A23D 9/06* (2013.01); *C11B 5/0021* (2013.01); *C11B 5/0085* (2013.01); *C11B 5/0092* (2013.01)

(58) Field of Classification Search
CPC ................. C11B 5/0071; A23D 9/06

USPC ............................................ 554/2
See application file for complete search history.

(56) References Cited

FOREIGN PATENT DOCUMENTS

| | | |
|---|---|---|
| JP | H01-176442 A | 7/1989 |
| JP | H02-005837 A | 1/1990 |
| JP | H09-315929 A | 12/1997 |
| JP | H10-237480 A | 9/1998 |
| JP | 2001-115185 A | 4/2001 |
| JP | 2003-306690 A | 10/2003 |
| JP | 2008-148692 A | 7/2008 |
| JP | 2008148692 A * | 7/2008 |

OTHER PUBLICATIONS

International Preliminary Report on Patentability and Written Opinion issued in corresponding International Patent Application No. PCT/JP2016/085496 dated Jun. 14, 2018.
International Search Report issued in corresponding International Patent Application No. PCT/JP2016/085496 dated Feb. 7, 2017.
Yasuda et al., "New Edition Yushi Seihin no Chishiki: Table 1.6 Fatty Acid Compositions of Major Vegetable Oils," 1st edition, 15 (1993).

* cited by examiner

*Primary Examiner* — Deborah D Carr
(74) *Attorney, Agent, or Firm* — Morgan, Lewis & Bockius LLP

(57) ABSTRACT

[Object] The present invention provides an oil composition in which oxidation of oil is inhibited and a method of inhibiting oxidation of oil.
[Solving Means] Provided is an oil composition containing oil, an ionic surfactant, and a polyhydric alcohol, in which a value L2−L1 calculated by the following method is positive.
  Value L1: a value of lightness of the oil composition
  Value L2: a value of lightness of an emulsified product obtained by adding 100 mass times of fresh water to the oil composition.

16 Claims, No Drawings

OIL COMPOSITION AND OXIDATION INHIBITING METHOD OF OIL

TECHNICAL FIELD

The present invention relates to an oil composition in which oxidation of oil is inhibited and a method of inhibiting oxidation of oil.

BACKGROUND ART

Oil easily produces a peroxide by action of oxygen in air, moisture, heat, light, metal ions, microorganisms, enzymes, or the like, and according to proceeding of oxidation reaction, unpleasant odor, deterioration of taste, browning, and the like occur. Further, in the case of intake of oxidized oil, the oxidized oil exerts an adverse influence on health, for example, digestive disturbance occurs.

Of fatty acids constituting oil, an unsaturated fatty acid having a carbon double bond is likely to be oxidized, and further, a polyunsaturated fatty acid having a plurality of double bonds has an exceptionally rapid oxidation rate.

Of the polyunsaturated fatty acids, in recent years, physiological activity of $\omega 3$ fatty acid such as eicosapentaenoic acid (EPA) or docosahexaenoic acid (DHA) has attracted attention, intake of the $\omega 3$ fatty acid has been actively recommended for the purpose of the maintaining and enhancing of health, beauty care, or the like. However, the $\omega 3$ fatty acid is a polyunsaturated fatty acid and has an exceptionally rapid oxidation rate. Thus, it is difficult to maintain quality of the $\omega 3$ fatty acid and oxidation inhibition becomes a big problem.

Regarding oil or food containing oil, oxidation of the oil has been inhibited by adding an antioxidative substance containing a natural material including vitamins such as tocopherol, $\beta$ carotene, and vitamin C, polyphenols such as catechin, sesamin, and rosemary extract, or the like.

However, particularly regarding the polyunsaturated fatty acid having a rapid oxidation rate, in present circumstances, a sufficient effect is not obtainable.

In addition, as a synthetic antioxidant agent, butylhydroxyanisol (BHA), dibutylhydroxytoluene, or the like is also used as a food additive, but there are also many consumers who concern about safety.

As another method, Patent Literature 1 discloses a method of adding a polyglycerin ester of saturated fatty acid having 8 to 22 carbon atoms to polyunsaturated lipid, and particularly describes that oxidation of oil is easily inhibited by adding a polyglycerol fatty acid ester to an oil-in-water (O/W) emulsified product of polyunsaturated lipid.

However, even using the method described in Patent Literature 1, a sufficient effect is not exhibited in oxidation inhibition of oil containing a polyunsaturated fatty acid.

CITATION LIST

Patent Literature

Patent Literature 1: Japanese Unexamined Patent Publication No. 2001-115185

SUMMARY OF INVENTION

Problems to be Solved by the Invention

An object of the present invention is to provide an oil composition in which oxidation of oil is inhibited and a method of inhibiting oxidation of oil, and particularly, can be more preferably applied to oil having a rapid oxidation rate like a polyunsaturated fatty acid such as $\omega 3$ fatty acid.

Means for Solving the Problems

The present inventors have conducted intensive studies in order to achieve the above-described object.

As a result, they have found out that in a case where a value L2−L1, which is calculated from a value L1 of lightness of an oil composition containing oil, an ionic surfactant, and a polyhydric alcohol and a value L2 of lightness of an emulsified product obtained by adding 100 mass times of fresh water to the oil composition, is positive, surprisingly, oxidation of oil can be more effectively inhibited, thereby completing the present invention.

That is, the present invention is as follows.

(1) An oil composition containing oil, an ionic surfactant, and a polyhydric alcohol, in which a value L2−L1 calculated by the following method is positive.

Value L1: a value of lightness of the oil composition

Value L2: a value of lightness of an emulsified product obtained by adding 100 mass times of fresh water to the oil composition (2) The oil composition described in (1), in which the value L2−L1 is 10 or more.

(3) The oil composition described in (1) or (2), in which with respect to the total amount of the oil composition, 60% or more and 95% or less of the oil, 0.5% or more and 10% or less of the ionic surfactant, and 3% or more and 35% or less of the polyhydric alcohol are blended.

(4) The oil composition described in any one of (1) to (3), in which an oxidation induction period of the oil composition is 130% or more with respect to an oxidation induction period of raw material oil.

(5) The oil composition described in any one of (1) to (4), in which a moisture content is 0% or more and 6% or less with respect to the total amount of the oil composition.

(6) The oil composition described in any one of (1) to (5), in which $\omega 3$ fatty acid is contained as a fatty acid constituting the oil, and a mass ratio of the $\omega 3$ fatty acid in the fatty acid constituting the oil is 5% or more.

(7) The oil composition described in any one of (1) to (6), in which the ionic surfactant is an amphoteric surfactant.

(8) The oil composition described in (7), in which a mass ratio of saturated fatty acid contained in a fatty acid constituting the amphoteric surfactant is 40% or more.

(9) The oil composition described in (7) or (8), in which the amphoteric surfactant is lysophospholipid.

(10) The oil composition described in any one of (7) to (9), in which a mass ratio of amino phospholipid contained in the fatty acid constituting the amphoteric surfactant is 0.01% or more.

(11) The oil composition described in any one of (7) to (10), in which the amphoteric surfactant is derived from egg yolk.

(12) The oil composition described in any one of (1) to (11), in which the polyhydric alcohol is glycerin.

(13) A method of inhibiting oxidation of oil, the method comprising adding an ionic surfactant and a polyhydric alcohol, in which an oil composition is adjusted such that a value L2−L1 calculated by the following method is positive.

Value L1: a value of lightness of the oil composition

Value L2: a value of lightness of an emulsified product obtained by adding 100 mass times of fresh water to the oil composition Effects of the Invention According to the present invention, it is possible to effectively inhibit oxidation of oil. Therefore, the present invention can contribute to long-term quality maintenance and demand expansion of an oil raw material used in food, supplement, cosmetics, and the like, particularly, an oil raw material containing a large amount of polyunsaturated fatty acid.

EMBODIMENTS FOR CARRYING OUT THE INVENTION

Hereinafter, the present invention will be described in detail.

In the present invention, "%" means "mass %" and "part(s)" means "part(s) by mass."

<Feature of Present Invention>

The present invention has a feature that by preparing an oil composition which is in a specific state by adding an ionic surfactant and a polyhydric alcohol to oil, oxidation of oil can be inhibited.

<Oil Composition>

The oil composition of the present invention is obtained by adding an ionic surfactant and a polyhydric alcohol to oil, and has the property that in measurement of a value L representing lightness of color using a colorimetric color-difference meter, a value of a difference (L2−L1) between a lightness value L1 of the oil composition and a lightness value L2 in a case where the oil composition is diluted 100-folds with fresh water is positive.

The value L is a numerical value representing lightness of color, and a larger value indicates brighter color. In the case of an emulsified product, since a scattered light quantity increases as emulsion particles become finer so that the emulsified product becomes whitish, the value L becomes larger. A change in the value L in the present invention occurs since phase transition occurs in the oil composition of the present invention by addition of water so that the oil composition becomes an emulsified product in which oil particles become finer and becomes cloudy and thus transparency is degraded.

In the present invention, the value L can be measured using a colorimetric color-difference meter (trade name "Color Meter ZE-2000": manufactured by NIPPON DENSHOKU INDUSTRIES CO., LTD.).

The property that an emulsified state in which oil becomes fine particles is easily created by adding water to the oil or the oil composition (O/W emulsification) is referred to as "self-emulsifying property." The oil composition of the present invention is an oil composition in which the state before the oil composition is self-emulsified by addition of water to obtain an O/W emulsified product is maintained. The self-emulsifying property is a characteristic that is observed in a system having an infinite aggregate in which molecules aggregate infinitely formed therein, such as bicontinuous microemulsion (BCME) in which liquid crystals or surfactants aggregate infinitely, and the stability of the system and the level of the self-emulsifying property have a proportional relation. Details of the structure of the oil composition of the present invention are not definite, but since the self-emulsifying property is exhibited by addition of water, the structure of the oil composition of the present invention is speculated to be a system having an infinite aggregate formed therein or a system having a state similar thereto.

The system having an infinite aggregate formed therein or the system having a state similar thereto has a specific structure in which respective phases constituting the system form consecutive channels. That is, it is considered that in the case of not having a definite emulsified interface as in an O/W emulsified product or a W/O emulsified product, a contact of the polyunsaturated fatty acid with an oxidation-promoting factor such as an oxygen molecule or an iron ion is not promoted, or the chain reaction of autoxidation is inhibited. Details of the mechanism are not clear, but it is speculated that maintaining of the specific structure considerably contributes to oxidation inhibition of the oil.

<Difference in Value L of Oil Composition Before and after Water Dilution>

When the self-emulsifying property of the oil composition of the present invention is a high level, the size of oil particles in an O/W emulsified product obtained in a case where the oil composition is diluted with water also becomes smaller, and as a result, the value L2 becomes larger. The level of the self-emulsifying property has a proportional relation with the stability of the oil composition as described above, and thus the value L2 represents the stability of the oil composition.

Therefore, as the value L2−L1 that is a difference between the value L (L1) of the oil composition before water dilution and the value L (L2) in a case where the oil composition is diluted 100-folds with water becomes larger, the oil composition of the present invention stably maintains the structure thereof and is excellent in the effect of inhibiting oxidation of the oil.

In the present invention, the value L2−L1 is positive and preferably 10 or more, and more preferably, when the value L2−L1 is 20 or more, the effect of inhibiting oxidation of the oil is more excellent.

<Oxidation Induction Period of Oil>

Oxidation of the oil is measured by a method of Test Example 2 to be described later using an oxidation stability acceleration test device. In the present invention, the oxidation induction period obtained by this measurement is preferably 130% or more and more preferably 180% or more of the raw material oil.

<Oil>

The oil in the present invention is a fatty acid ester having a glycerin skeleton or a fatty acid derivative, and contains at least unsaturated fatty acid in the fatty acid in the present invention.

Examples of the fatty acid ester having a glycerin skeleton include fatty acid triglyceride, fatty acid diglyceride, and fatty acid monoglyceride.

Examples of the fatty acid derivative include esters of fatty acid and alcohol such as fatty acid methyl ester and fatty acid ethyl ester, and esters of fatty acid and sterols such as phytosterol and cholesterol. However, the ionic surfactant of the present invention is excluded.

Examples of the unsaturated fatty acid include oleic acid, linoleic acid, α-linolenic acid, γ-linolenic acid, arachidonic acid, eicosapentaenoic acid (EPA), docosahexaenoic acid (DHA), henicosapentaenoic acid (HPA), docosapentaenoic acid (DPA), eicosatetraenoic acid (ETA), eicosatrienoic acid (ETE), and stearidonic acid (STA).

As the oil of the present invention, animal and plant oil, such as soybean oil, rapeseed oil, sunflower oil, safflower oil, palm oil, corn oil, cotton seed oil, rice oil, shiso oil, perilla oil, olive oil, almond oil, coconut oil, linseed oil, grape seed oil, oil obtained by cultivation of algae or microorganisms, egg yolk oil, fish oil, whale oil, and liver oil, or refined oil (salad oil) thereof that is a fatty acid ester having a glycerin skeleton or a fatty acid derivative and is a mixture in which at least unsaturated fatty acid is contained in the fatty acid may be used in the present invention, and saturated fatty acids such as myristic acid, palmitic acid, and stearic acid may be included.

The oil composition of the present invention more effectively inhibits oxidation of oil which are easily oxidized. Therefore, the oil composition is suitable for oil containing a large amount of polyunsaturated fatty acid.

<Amount of Oil Blended>

The amount of the oil blended is preferably 60% or more and 95% or less and more preferably 65% or more and 95% or less with respect to the total amount of the oil composition from the viewpoint of more easily maintaining the state of the oil composition and more effectively inhibiting oxidation of the oil.

<ω3 Fatty Acid>

The method of the present invention can be preferably used in a case where ω3 fatty acid is contained as the fatty acid constituting the oil.

The ω3 fatty acid is a general term for polyunsaturated fatty acids having a double bond at the third position from the terminal carbon (ω carbon), and it is known that an oxidation rate is exceptionally rapid. As the ω3 fatty acid, for example, other than EPA and DHA, α-linolenic acid (ALA) or the like is mentioned.

As the oil containing the ω3 fatty acid, fish oil, oil obtained by cultivation of algae or microorganisms, linseed oil, perilla oil, and the like are exemplified.

<Content Ratio of ω3 Fatty Acid>

The content ratio of the ω3 fatty acid in a case where the ω3 fatty acid is contained in the oil is not particularly limited, but from the viewpoint of more effectively inhibiting oxidation of the oil, the content ratio thereof is preferably 5% or more and more preferably 10% or more in terms of mass ratio with respect to the entire fatty acid constituting the oil.

<Ionic Surfactant>

The ionic surfactant is to be ionized when the ionic surfactant is dissolved in water and to generate ions, and there are three types of surfactants, that is, anionic, cationic, and amphoteric surfactants.

In the present invention, at least one surfactant selected from the three types of surfactants described above is contained. In addition, any surfactant derived from nature, synthesis, and semi-synthesis can be used.

Examples of the anionic surfactant include organic acid monoglyceride in which an organic acid (such as acetic acid, lactic acid, citric acid, succinic acid, or diacetyl tartaric acid) is further bonded to the hydroxyl group of monoglyceride, perfluorocarboxylic acid or a salt thereof, alkyl sulfate such as sodium dodecyl sulfate or ammonium lauryl sulfate, phosphatidylinositol, and phosphatidylglycerol.

Examples of the cationic surfactant include quaternary ammonium salts such as benzalkonium chloride and benzethonium chloride.

Examples of the amphoteric surfactant include alkyl betaine such as stearyl betaine or lauryl betaine, alkylamine oxide such as lauryl dimethylamine oxide, and phospholipid such as phosphatidylcholine, phosphatidylethanolamine, phosphatidylserine, or phosphatidylcholine, or lysophospholipid obtained by lyso-converting these.

Incidentally, an emulsified material having an action similar to the ionic surfactant is also included in the ionic surfactant.

<Amount of Surfactant Blended>

The amount of the surfactant blended is preferably 0.5% or more and 10% or less, more preferably 0.5% or more and 8% or less, and further preferably 1% or more and 5% or less with respect to the entire oil composition, from the viewpoint of more easily maintaining the state of the oil composition and more effectively inhibiting oxidation of the oil.

<Amphoteric Surfactant>

In the present invention, when an amphoteric surfactant of the three types of surfactants is used, it is easy to effectively inhibit oxidation of the oil.

The amphoteric surfactant is a surfactant in which ionicity changes depending on pH. When the hydrophilic group is negatively charged, the amphoteric surfactant shows properties of the anionic surfactant, and when the hydrophilic group is positively charged, the amphoteric surfactant shows properties of the cationic surfactant. That is, when the oil composition described in the present invention is prepared, the amphoteric surfactant acts as an ionic surfactant at all times regardless of ionicity due to components to be blended, and it is easy to faun the oil composition of the present invention having the self-emulsifying property. Further, also when a self-emulsified product is obtained by adding water to the oil composition, it is possible to obtain a fine and stable O/W emulsified product without being affected by coexistence of ionic components (salts and the like) other than water.

<Fatty Acid Constituting Amphoteric Surfactant>

A fatty acid constituting the amphoteric surfactant used in the present invention is preferably a saturation type, from the viewpoint of more effectively inhibiting oxidation of the oil. When the fatty acid constituting the amphoteric surfactant is a saturation type, the surfactant itself is less likely to be oxidized. In addition, the blended unsaturated fatty acid part of the oil is mixed in a system having an infinite aggregate formed therein or in a state similar thereto on the molecular level, and thus it is speculated that the effect of inhibiting chains of autoxidation is also obtainable.

<Component Ratio of Saturated Fatty Acid Constituting Amphoteric Surfactant>

The saturated fatty acid constituting the amphoteric surfactant is preferably 40% or more and more preferably 65% or more in teams of mass ratio with respect to the entire fatty acid constituting the fatty acid, from the viewpoint of more effectively inhibiting oxidation of the oil. As such an amphoteric surfactant, phospholipid derived from egg yolk is exemplified.

<Phospholipid>

In the present invention, from the viewpoint of easily forming and maintaining the state of the oil composition and more effectively inhibiting oxidation of the oil, phospholipid among the amphoteric surfactants is preferable used.

The phospholipid is lipid having a phosphoric acid ester and a phosphonic acid ester and is an amphiphilic substance having both a hydrophilic group and a hydrophobic group.

Examples of the phospholipid include glycerophospholipid having glycerol as a skeleton such as phosphatidylcholine, phosphatidylethanolamine, phosphatidylserine, or phosphatidylinositol and sphingophospholipid having sphingosine as a skeleton such as sphingomyelin.

Among the phospholipids, phosphatidylcholine, phosphatidylethanolamine, or phosphatidylserine is preferably used, and a mixture containing these phospholipids, for example, egg yolk, egg-yolk lecithin, soy milk, or the like may also be used. In the case of using a mixture containing phospholipid, the phospholipid part contained in the mixture corresponds to the ionic surfactant of the present invention.

For example, in the case of using egg-yolk lecithin (PL-30, LPL-20S: manufactured by Kewpie Corporation, and the like), the phospholipid contained in the mixture corresponds to the ionic surfactant of the present invention and the egg yolk oil part corresponds to the oil of the present invention.

<Lysophospholipid>

In the present invention, when lysophospholipid obtained by lyso-converting the aforementioned phospholipid is used, it is possible to further effectively inhibit oxidation of the oil.

Of lysophospholipids, when lysophosphatidylcholine, lysophosphatidylethanolamine, or lysophosphatidylserine is used, it is easy to stably form the state of the oil composition, and the effect of inhibiting oxidation of the oil is excellent.

<Content of Amino Phospholipid>

In the present invention, from the viewpoint of more effectively inhibiting oxidation of the oil, it is preferable that an amino phospholipid having a free amino group, such as phosphatidylethanolamine, phosphatidylserine, lysophosphatidylethanolamine, or lysophosphatidylserine, is contained in 0.01% or more in terms of mass ratio with respect to the total amount of the surfactant.

The amino phospholipid is obtained by binding ethanolamine, serine, or the like to a phosphoric acid group of phosphatidic acid, and has a free amino group in the molecule. These amino phospholipids are contained in the ionic surfactant of the present invention.

The phospholipid acts as a surfactant and is known as a synergist (a component having an action of increasing the effect by coexistence with an antioxidant agent such as tocopherol) in oxidation inhibition of oil or food. This effect is strong in the case of an amino phospholipid having a free amino group, such as phosphatidylethanolamine or phosphatidylserine, of phospholipids, and the metallic chelate effect or the like of a phosphoric acid group part is considered as one factor.

The oil composition of the present invention is a system having an infinite aggregate formed therein or a system having a similar state thereto, and it is estimated that sufficient contact of the oil with the amino phospholipid on the molecular level without forming an emulsified interface considerably contributes to the effect of inhibiting oxidation of the oil.

An isolated amino phospholipid may be added, or may be added as a composition containing those amino phospholipids, for example, a composition such as egg-yolk lecithin (PL-30, LPL-20S: manufactured by Kewpie Corporation, and the like).

In the present invention, as the ionic surfactant, lysophospholipid derived from egg yolk can be suitably used.

<Polyhydric Alcohol>

The polyhydric alcohol acts for maintaining the state in which an infinite aggregate is formed in the oil composition or the state similar thereto.

The polyhydric alcohol is a general term for an alcohol having two or more hydroxy groups in the molecule, and examples thereof include glycerin, ethylene glycol, propylene glycol, or polymers thereof, alkane diol such as 1,3-butanediol, 1,4-butanediol, or 1,2-propanediol, and sugar alcohol such as maltitol, lactitol, sorbitol, xylitol, erythritol, reduced palatinose, or reduced sugar syrup.

In the present invention, particularly, when glycerin is used, the state of the oil composition is easily formed and the state thereof is easily maintained, and thus oxidation of the oil is more effectively inhibited.

<Amount of Polyhydric Alcohol Blended>

The amount of the polyhydric alcohol blended is preferably 3% or more and 35% or less and more preferably 5% or more and 30% or less with respect to the total amount of the oil composition, from the viewpoint of more effectively inhibiting oxidation of the oil. When the amount of the polyhydric alcohol blended is in the above range, the state of the oil composition is easily formed and the state thereof is easily maintained.

<Moisture>

In the present invention, the oil composition may contain moisture in the range that the effect of inhibiting oxidation of the oil is not impaired.

In the case of containing moisture, fresh water may be blended, and the moisture may be a blend raw material containing moisture, for example, may be derived from liquid sugar or the like containing water as the polyhydric alcohol.

<Moisture Content>

The moisture content is preferably 0% or more and 6% or less and more preferably 0% or more and 3% or less with respect to the total amount of the oil composition, from the viewpoint of more effectively inhibiting oxidation of the oil.

<Other Raw Materials>

In the present invention, raw materials other than the oil, the ionic surfactant, and the polyhydric alcohol that are essential raw materials of the present invention can be appropriately selected in the range that the effect of the present invention is not impaired and can be blended.

Specific examples thereof include retinoic acid, retinol, tocopherol, ascorbic acid, sterols, carotenoid such as β-carotene, lycopene, lutein, or astaxanthin, flavonoid such as isoflavone, anthocyanidin, anthocyanin, catechin, theaflavin, procyanidin, chlorogenic acid, tannin, sesamin, sesamolin, curcumin, quercetin, or hesperidin, resveratrol, coenzyme Q10, hyaluronic acid, collagen, chondroitin, placenta products, and derivatives thereof, extracts such as crude drugs, minerals such as iron, zinc, calcium, copper, and magnesium, various amino acids, various vitamins, various peptides, sweeteners such as trehalose, aspartame, and phenylalanine, acidulants such as citric acid, acetic acid, lactic acid, phosphoric acid, and citrus juice, glucose, sucrose, lactose, dietary salt, soy sauce, other seasoning agents, thickening and stabilizing agents such as pectin, gelatin, agar, alginic acid, soybean polysaccharide, cellulose, xanthane gum, guar gum, and carrageenan, colorants, fragrances, and preservatives.

<Method for Producing Oil Composition>

The oil composition of the present invention can be produced by mixing raw materials using an ordinary method. For example, an ionic surfactant and a polyhydric alcohol are uniformly mixed under stirring and oil is mixed with the mixture under stirring while being added thereto.

When the oil composition is produced under a nitrogen atmosphere, contact of the raw material with oxygen in air is suppressed to the minimum, and thus oxidation of the oil in the oil composition is more effectively inhibited.

Hereinafter, the present invention will be described in detail based on Examples, Comparative Examples, and Test Examples. Incidentally, the present invention is not limited thereto.

EXAMPLES

Example 1

The oil composition of the present invention containing fish oil was produced according to compositions in Table 1.

That is, egg yolk lysophospholipid and glycerin were added to a beaker made of glass and mixed under stirring using a propeller stirrer equipped with an anchor to make a uniform state. Thereafter, oil was gradually added over 10 minutes while stirring was continued to obtain the oil composition of the present invention.

Comparative Example 1

A mixture of fish oil and other raw materials was produced according to compositions in Table 1.

That is, fish oil, egg yolk lysophospholipid, and glycerin were put into a beaker made of glass and mixed under stirring using a propeller stirrer equipped with an anchor to obtain a mixture of fish oil and other raw materials.

Comparative Example 2

An oil-in-water emulsified product containing fish oil was produced according to compositions in Table 1.

That is, glycerin and water were added to a beaker made of glass and stirred until the mixture became uniform. Egg yolk lysophospholipid was added thereto, and the mixture was stirred using a homo mixer at 3000 rpm for 5 minutes, and then oil was gradually added over 5 minutes while stirring was continued to obtain an oil-in-water emulsified product.

Test Example 1

Measurement of Value L

Example 1, Comparative Examples 1 and 2, and fish oil as a control were used, values L of respective samples before and after water dilution were measured three times by the following method to calculate an average value thereof, thereby calculating value L2–L1.

<Measurement Apparatus>
Colorimetric color-difference meter (Color Meter ZE-2000, manufactured by NIPPON DENSHOKU INDUSTRIES CO., LTD.)
<Measurement Conditions>
Value L (L1) of the Sample Before Water Dilution
1.5 g of the sample before water dilution was put into a circular cell and then provided to the measurement.
Value L (L2) of the Sample after Water Dilution
0.2 g of the sample before dilution was collected in a beaker, 19.8 g of fresh water was added thereto and stirred. 1.5 g of the obtained sample after water dilution was put into a circular cell and provided to the measurement.

Test Example 2

Oxidation Stability of Oil

Example 1, Comparative Examples 1 and 2, and fish oil as a control were used, and the oxidation rate of each sample was measured by the following method using an oxidation stability acceleration test device.

That is, the sample was collected in a sample tray and put into a reaction chamber of the oxidation stability acceleration test device, and then the reaction chamber was sealed. Thereafter, the inside of the reaction chamber was filled with oxygen gas and pressurized. The reaction chamber was heated and then the internal pressure was measured. A time period until a rapid decrease in the internal pressure caused by oxidation of the sample occurs was calculated as the oxidation induction period.

<Measurement Apparatus>
Oxidation stability acceleration test device (trade name: OXY Test, manufactured by YELP Scientifica)
<Measurement Conditions>
Sample amount: 10.0 g (using one sample tray and two spacers)
O2 pressurization: 6 bar
Heating temperature: 90□
<Evaluation Criteria>
A: The oxidation induction period is 180% or more of the raw material oil.
B: The oxidation induction period is 130% or more of the raw material oil.
C: The oxidation induction period is less than 130% of the raw material oil.

TABLE 1

| Blend raw material | Example 1 | Comparative Example 1 | Comparative Example 2 |
|---|---|---|---|
| Fish oil/% | 85 | | 66 |
| Egg yolk lysophospholipid/% | 4 | | 3 |
| Glycerin/% | 11 | | 8 |
| Fresh water/% | 0 | | 23 |
| Moisture content/% | 0.55 | | 23 |
| Value L2 - L1 | 37 | −22 | −32 |
| Oxidation stability | A | C | C |

※ The oxidation induction period of the raw material oil (fish oil) is 4 hours and 15 minutes.
※ The ω3content ratio in the fish oil is 30%.
※ The mass ratio of the saturated fatty acid in the egg yolk lysophospholipid is 80%, and the mass ratio of the amino phospholipid in the egg yolk lysophospholipid is 16%.
※ The purity of glycerin is 95%.

From Table 1, the fish oil (Example 1) having the state of the oil composition of the present invention had a value L2–L1 of 10 or more, the structure of the oil composition of the present invention was more stably maintained, and the oxidation induction period was also 180% or more of the fish oil serving as raw material oil. It is found out that oxidation of the oil is considerably inhibited.

On the other hand, the product (Comparative Example 1) having the state in which raw materials of the oil composition of the present invention are simply mixed and the product (Comparative Example 2) formed as an oil-in-water emulsified product had a value L2–L1 which is negative and did not have the state of the oil composition of the present invention, and a specific effect relating to oxidation inhibition of the fish oil was not observed.

From the above result, it can be understood that with the state of the oil composition of the present invention, oxidation of the oil is inhibited.

In Examples 2 to 5 and Comparative Example 7, the oil composition of the present invention containing fish oil was produced by the same method as in Example 1 according to compositions in Table 2.

In Comparative Examples 3 to 6, a mixture containing fish oil and other raw materials was produced by the same method as in Comparative Example 1 according to compositions in Table 2.

TABLE 2

| Blend raw material | | Example 2 | Comparative Example 3 | Example 3 | Comparative Example 4 | Example 4 | Comparative Example 5 | Example 5 | Comparative Example 6 | Comparative Example 7 |
|---|---|---|---|---|---|---|---|---|---|---|
| Oil % | Fish oil | 91 | | 65 | | 85 | | | 65 | 84 |
| Emulsifying agent % | Egg yolk lysophospholipid | 2 | | 3 | | | | | | |
| | Soybean lysophospholipid | | | | | | 4 | | 1 | |
| | Polyglycerol fatty acid ester (HLB value: 12) | | | | | | | | | 8 |
| Polyhydric alcohol % | Glycerin | 7 | | 32 | | 11 | | | 25 | 8 |
| Fresh water % | | 0 | | 0 | | 0 | | | 9 | 0 |
| Evaluation | Moisture content % | 0.35 | | 1.6 | | 0.55 | | | 10 | 0.4 |
| | Value L2 − L1 | 29 | −4.1 | 18 | −20 | 32 | −55 | 4 | −6.7 | 22 |
| | Oxidation stability | A | C | A | C | A | C | B | C | C |

※ The oxidation induction period of the raw material oil (fish oil) is 4 hours and 15 minutes.
※ The ω3 content ratio in the fish oil is 30%.
※ The mass ratio of the saturated fatty acid in the egg yolk lysophospholipid is 55%, and the mass ratio of the amino phospholipid in the egg yolk lysophospholipid is 11%.
※ The purity of glycerin is 95%.

From Table 2, the fish oil (Examples 2 to 5) having the state of the oil composition of the present invention had a value L2−L1 of 10 or more, and the structure of the oil composition of the present invention was more stably maintained. In addition, the oxidation induction period was 180% or more of the fish oil serving as raw material oil, and it is found out that oxidation of the oil is considerably inhibited. In particular, the product (Examples 2 to 4) in which the content of the oil is 65% or more and 95% or less and lysophospholipid is used as the ionic surfactant had a value L2−L1 of 10 or more, and it was shown that the structure of the oil composition of the present invention was more stably maintained, the oxidation induction period was 180% or more of the fish oil serving as raw material oil, and the product was excellent in the effect of inhibiting oxidation of the oil.

Further, the product (Examples 2 to 4) in which the moisture content is 0% or more and 6% or less also was excellent in effect of inhibiting oxidation of the oil.

On the other hand, in the product (Comparative Examples 1 to 6) in which the value L2−L1 is negative and which did not have the state of the oil composition of the present invention, a specific effect with respect to oxidation inhibition of the fish oil was not observed.

In addition, the product (Comparative Example 7) using a nonionic surfactant had the structure of the oil composition of the present invention, but a specific effect with respect to oxidation inhibition of the fish oil was not observed.

From the above description, it was shown that when the oil have the state of the oil composition of the present invention containing an ionic surfactant and a polyhydric alcohol and having the self-emulsifying property, oxidation of the oil is considerably inhibited.

Example 6

The oil composition of the present invention was produced by the same method as in Example 1 using linseed oil as the oil, egg yolk lysophospholipid as the ionic surfactant, and saccharified reduced starch as the polyhydric alcohol according to compositions in Table 3.

Comparative Example 8

A mixture containing linseed oil and other raw materials was produced by the same method as in Comparative Example 1 according to compositions in Table 3.

TABLE 3

| Blend raw material | Example 6 | Comparative Example 8 |
|---|---|---|
| Linseed oil/% | 75 | |
| Egg yolk lysophospholipid/% | 6 | |
| Saccharified reduced starch/% (70% aqueous solution) | 19 | |
| Moisture content/% | 5.7 | |
| Value L2 − L1 | 22 | −16 |
| Oxidation stability | B | C |

※ The oxidation induction period of the raw material oil (linseed oil) is 5 hours and 7 minutes.
※ The ω3 content ratio in the linseed oil is 50%.
※ The mass ratio of the saturated fatty acid in the egg yolk lysophospholipid is 90%, and the mass ratio of the amino phospholipid in the egg yolk lysophospholipid is 18%.

From Table 3, the linseed oil (Example 6) having the state of the oil composition of the present invention had a value L2−L1 of 10 or more, the structure of the oil composition of the present invention was stably maintained, and oxidation of the oil was inhibited. On the other hand, when Example 6 is compared with the case of glycerin as the polyhydric alcohol (Examples 1 to 4), the effect of inhibiting oxidation of the oil is slightly degraded, and it is found out that glycerin is more preferable as the polyhydric alcohol.

On the other hand, in the product (Comparative Example 8) in which the oil does not have the state of the oil composition of the present invention, a specific effect with respect to oxidation inhibition of the fish oil was not observed.

Example 7

The oil composition of the present invention was produced by the same composition and method as in Example 1, except that the oil was replaced with DHA-containing triglyceride (ω3 fatty acid content ratio: 22%) containing 200 ppm of tocopherol. Incidentally, the oxidation induction period of the DHA-containing triglyceride serving as the raw material oil was 2 hours and 43 minutes.

The value L2−L1 of the obtained oil composition was 10 or more, and the structure of the oil composition of the present invention was stably maintained. In addition, the oxidation induction period was 180% or more of the oxidation induction period of the DHA-containing triglyceride serving as the raw material oil, and the product was very excellent in the effect of inhibiting oxidation of the oil.

Example 8

The oil composition of the present invention was produced by the same composition and method as in Example 1, except that the oil was replaced with DHA-containing triglyceride (ω3 fatty acid content ratio: 22%) containing 1000 ppm of tocopherol and glycerin was replace with glycerin having a purity of 99%. Incidentally, the oxidation induction period of the DHA-containing triglyceride serving as the raw material oil was 2 hours and 43 minutes and the moisture content was 0.11%.

The value L2−L1 was 10 or more, and the structure of the oil composition of the present invention was stably maintained. In addition, the oxidation induction period was 180% or more of the oxidation induction period of the DHA-containing triglyceride serving as the raw material oil and the product was very excellent in the effect of inhibiting oxidation of the oil.

Example 9

The oil composition of the present invention was produced by the same method as in Example 1 according to compositions in Table 4. Incidentally, the oxidation induction period of the DHA-containing triglyceride serving as the raw material oil was 3 hours and 56 minutes and the moisture content was 17.1%.

TABLE 4

| Blend raw material | Example 9 |
| --- | --- |
| DHA-containing triglyceride/% | 40 |
| Egg yolk lysophospholipid/% | 3 |
| Sugar alcohol/% (70% aqueous solution) | 52 |
| Ethanol/% | 2 |
| Fresh water/% | 3 |
| Moisture content/% | 17.1 |
| Value L2 - L1 | 7.8 |
| Oxidation stability | B |

The value L2−L1 of the obtained oil composition was positive, and the structure of the oil composition of the present invention was stably maintained. In addition, the oxidation induction period was 130% or more of the oxidation induction period of the DHA-containing triglyceride serving as the raw material oil, and the product had the effect of inhibiting oxidation of the oil.

Example 10

The oil composition of the present invention was produced by the same method as in Example 1 according to compositions in Table 4, except that preparation was performed under a nitrogen atmosphere. Incidentally, the oxidation induction period of the DHA-containing triglyceride serving as the raw material oil was 3 hours and 56 minutes, and the moisture content was 17.1%.

The value L2−L1 of the obtained oil composition was 10 or more, and the structure of the oil composition of the present invention was stably maintained. In addition, the oxidation induction period was 180% or more of the oxidation induction period of the DHA-containing triglyceride serving as the raw material oil, and the product was very excellent in the effect of inhibiting oxidation of the oil.

The invention claimed is:

1. An oil composition comprising oil, an ionic surfactant, and a polyhydric alcohol,
   wherein a value L2−L1 is positive, wherein
   L1 is a value of lightness of the oil composition, and
   L2 is a value of lightness of an emulsified product obtained by adding 100 mass times of fresh water to the oil composition,
   wherein with respect to a total amount of the oil composition, 40% or more and 95% or less of the oil, more than 0.5% and 10% or less of the ionic surfactant, and 3% or more and 36.4% or less of the polyhydric alcohol are blended, and
   the ionic surfactant is an amphoteric surfactant of lysophospholipid.

2. The oil composition according to claim 1, wherein the value L2−L1 is 10 or more.

3. The oil composition according to claim 1, wherein with respect to the total amount of the oil composition,
   60% or more and 95% or less of the oil, 0.5% or more and 10% or less of the ionic surfactant, and 3% or more and 35% or less of the polyhydric alcohol are blended.

4. The oil composition according to claim 1, wherein an oxidation induction period of the oil composition is 130% or more with respect to an oxidation induction period of raw material oil.

5. The oil composition according to claim 1, wherein a moisture content is 0% or more and 6% or less with respect to the total amount of the oil composition.

6. The oil composition according to claim 1, wherein ω3 fatty acid is contained as a fatty acid constituting the oil, and
   a mass ratio of the ω3 fatty acid in the fatty acid constituting the oil is 5% or more.

7. The oil composition according to claim 1, wherein a mass ratio of saturated fatty acid contained in a fatty acid constituting the amphoteric surfactant is 40% or more.

8. The oil composition according to claim 1, wherein a mass ratio of amino phospholipid contained in the fatty acid constituting the amphoteric surfactant is 0.01% or more.

9. The oil composition according to claim 1, wherein the amphoteric surfactant is derived from egg yolk.

10. The oil composition according to claim 1, wherein the polyhydric alcohol is glycerin.

11. A method of inhibiting oxidation of oil, the method comprising adding an ionic surfactant and a polyhydric alcohol,
    wherein an oil composition is adjusted such that a value L2−L1 is positive, wherein
    L1 is a value of lightness of the oil composition, and
    L2 is a value of lightness of an emulsified product obtained by adding 100 mass times of fresh water to the oil composition,
    wherein with respect to a total amount of the oil composition, 40% or more and 95% or less of the oil, 0.5% or more and 10% or less of the ionic surfactant, and 3% or more and 36.4% or less of the polyhydric alcohol are blended, and
    the ionic surfactant is an amphoteric surfactant of lysophospholipid.

12. The oil composition according to claim 3, wherein an oxidation induction period of the oil composition is 130% or more with respect to an oxidation induction period of raw material oil.

13. The oil composition according to claim 1, wherein the value L2−L1 is 20 or more.

14. The oil composition according to claim 1, wherein an oxidation induction period of the oil composition is 180% or more with respect to an oxidation induction period of raw material oil.

15. The oil composition according to claim 1, wherein with respect to the total amount of the oil composition, 0.5% or more and 8% or less of the ionic surfactant is blended.

16. The oil composition according to claim 1, wherein with respect to the total amount of the oil composition, 1% or more and 5% or less of the ionic surfactant is blended.

* * * * *